United States Patent
Douret et al.

(10) Patent No.: US 7,557,835 B2
(45) Date of Patent: Jul. 7, 2009

(54) METHOD FOR CALIBRATING AT LEAST TWO VIDEO CAMERAS RELATIVELY TO EACH OTHER FOR STEREOSCOPIC FILMING AND DEVICE THEREFOR

(75) Inventors: Jerome Douret, Paris (FR); Ryad Benosman, Paris (FR); Jean Devars, Villebon-sur-Yvette (FR); Salah Bouzar, Sceaux (FR)

(73) Assignee: Citilog, Paris (FR)

( * ) Notice: Subject to any disclaimer, the term of this patent is extended or adjusted under 35 U.S.C. 154(b) by 477 days.

(21) Appl. No.: 10/565,631

(22) PCT Filed: Jul. 9, 2004

(86) PCT No.: PCT/FR2004/001824

§ 371 (c)(1),
(2), (4) Date: Sep. 15, 2006

(87) PCT Pub. No.: WO2005/022929

PCT Pub. Date: Mar. 10, 2005

(65) Prior Publication Data

US 2007/0008405 A1 Jan. 11, 2007

(30) Foreign Application Priority Data

Jul. 28, 2003 (FR) .................................. 03 09208

(51) Int. Cl.
*H04N 5/228* (2006.01)
(52) U.S. Cl. .................................... 348/222.1; 348/180

(58) Field of Classification Search ....................... None
See application file for complete search history.

(56) References Cited

U.S. PATENT DOCUMENTS 5,757,674 A * 5/1998 Marugame .................. 702/152
5,905,568 A * 5/1999 McDowell et al. ............ 356/28
7,103,212 B2 * 9/2006 Hager et al. ................ 382/154

FOREIGN PATENT DOCUMENTS

EP          1 089 054       4/2001
WO       WO 02/50770       6/2002

* cited by examiner

*Primary Examiner*—Sinh Tran
*Assistant Examiner*—Yogesh Aggarwal
(74) *Attorney, Agent, or Firm*—Young & Thompson

(57) ABSTRACT

Methods for calibrating at least two video cameras for a stereoscopic device includes: providing, on the lane portion, nine marks of hue other than that of the lane, sequenced on a first set of three concurrent virtual straight lines in a first point and distributed in specific manner on a second set of concurrent virtual straight lines in a second point; forming, with each of the cameras an image of the lane portion; defining, in each of the two images, one characteristic point of each mark image; determining, with the characteristic points, six concurrent straight line images respectively in two concurrent points; and processing the video signals delivered by each video camera such that the signals are representative of two images suitable for forming a stereoscopic video image. The method is useful for determining the occupancy condition of a lane portion and detecting incidents.

20 Claims, 4 Drawing Sheets

METHOD FOR CALIBRATING AT LEAST TWO VIDEO CAMERAS RELATIVELY TO EACH OTHER FOR STEREOSCOPIC FILMING AND DEVICE THEREFOR

The present invention relates to methods for calibrating at least two video cameras relative to each other when the two cameras make up a system for filming in stereo a portion of pathway along which bodies or items of any kind are liable to travel, in particular for the purpose of determining the state of occupation of said pathway portion and for detecting any incidents that might occur on said pathway portion.

This technique of using stereoscopic vision serves to determine a third dimension for the items, i.e. their relief, by lifting ambiguities due to shadows, reflections, etc. that might be found on the items, and can be most advantageous, particularly but not exclusively, in the field of monitoring road traffic.

These methods find a particularly advantageous application in detecting incidents of any kind on portions of motor vehicle roadway, or the like, it being specified that they can also be used for surveillance of portions of pathways of any other type along which any kind of body might move, whether living bodies such as pedestrians or the like walking on sidewalks or the like, or items such as manufactured goods placed on transfer paths, such as conveyor belts, railway lines, or the like.

The present invention also relates to apparatuses serving to implement the methods for calibrating at least two video cameras relative to each other when the two cameras form part of a system for stereoscopically filming a portion of a pathway of any kind.

At present, in order to undertake surveillance of a pathway portion, such as a portion of roadway, use is made of a video camera which films said portion of pathway, optionally continuously. The images that are obtained are processed by a technique that is well known to the person skilled in the art and is referred to as "image analysis". The initial techniques to be implemented made use essentially of a single camera. Numerous documents, in particular patents, have been published relating thereto, and that technique is indeed still in widespread use.

Nevertheless, in order to refine the surveillance of portions of pathway, apparatuses have been made that comprise at least two video cameras for filming stereoscopically, and that technique is likewise well known in itself.

It is recalled that the technique consists in using at least two cameras that are pointed towards an item for filming, with or without a small angle between their optical axes, just like the two eyes of the optical system of a human being. That technique makes it possible to obtain views that appear to be "in relief" when they are viewed or analyzed using an appropriate technique, which since that technique is known in itself, is not repeated herein.

In order to obtain a good pair of stereo images, the two cameras must naturally give images that are dimensioned in the same manner in the same frame of reference, i.e. the images must be very similar in terms of dimensions and it must be possible for them to be combined using the stereovision technique in order to facilitate stereoscopic viewing.

With a still camera, it is not very difficult to obtain stereoscopic views, e.g. by using the same objective lens and the same focal plane for taking the two views.

That technique is not easily adaptable to video cameras. Use must be made of two video cameras that are adjusted specifically one relative to the other so as to output images that are very similar to each other in order to obtain the stereoscopic effect, as is well known in itself. When such a device is provided for determining the traffic occupation state of a roadway, the two cameras are calibrated in the factory, e.g. using calibration patterns. Calibration serves to determine the relative positioning of the cameras and also parameters that are intrinsic to each of them. Thereafter, the cameras are placed in a special protective housing serving to lock them in position relative to each other, and including means for tilting each camera generally about two or three orthogonal axes, and possibly also means for adjusting the focal lengths of each of the camera lenses. Once these adjustments have been carried out, they are locked and the housing is transported to the site where it is to be located using the adjustments set in the factory.

It must the be hoped that all of the settings were initially carried out correctly, since if it is necessary to adjust them once the housing is on site, such adjustments can be difficult or even impossible, particularly given the location and/or the situation, of the housing containing the cameras relative to the portion of pathway.

In any event, as with any apparatus, it will be necessarily periodically to recalibrate the two cameras relative to each other, with the only acceptable solution being to return them to the factory to carry out the new adjustments.

Thus, an object of the present invention is to provide a method of calibrating at least two video cameras relative to each other, when the two cameras constitute apparatus for stereoscopically filming a portion of pathway along which bodies of any kind might travel, in order to carry out surveillance of the state of occupation of said portion of pathway, and in particular in order to detect any incidents that might occur on said portion of pathway, which method is simpler than prior art methods in the same field and can thus be automated easily and can be applied in any location, thus enabling calibration of the two video cameras to be performed on site, and at any time should that be necessary, without it being necessary, for example, to dismantle the housing containing the cameras.

Another object of the present invention is to provide apparatus enabling said method to be implemented.

More precisely, the present invention provides a method of calibrating at least two video cameras relative to each other when said two cameras constitute apparatus for stereoscopically filming a portion of pathway suitable for having any type of body traveling therealong, in order to detect the state of occupation of said portion of pathway, and in particular to detect incidents that might occur on said portion of pathway, the method being characterized in that it consists:

in placing a plurality of marks on the surface of the portion of pathway, said marks being distributed substantially:

in ordered manner on a first group of first and second geometrical lines $D_1$, $D_2$ meeting at a first point $P_1$; and in such a manner that given points belonging respectively to the marks having the same order relative to the first point $P_1$ on said first and second geometrical lines $D_1$, $D_2$ are situated on a second group of fourth and fifth geometrical lines $D_4$, $D_5$ meeting at a second point $P_2$ that does not coincide with the first point $P_1$;

in forming a video image of said portion of pathway including said marks, using each of the two video cameras;

in defining a characteristic point $P_c$ for each image of a mark in each of the two video images;

in determining first and second image lines $D_{1i}$, $D_{2i}$ and fourth and fifth image lines $D_{4i}$, $D_{5i}$ from said characteristic points $P_c$;

in determining a first image meeting point for the first and second image lines $D_{1i}$, $D_{2i}$ and a second image meeting point for the fourth and fifth image lines $D_{4i}$, $D_{5i}$, in each of the video images; and in processing the video signals delivered by each video camera in such a manner that these signals are representative of two images suitable for being processed by stereovision.

According to another characteristic of the method of the present invention, said plurality of marks ($M_{11}$, $M_{12}$, $M_{13}$; $M_{21}$, $M_{22}$, $M_{23}$; $M_{31}$, $M_{32}$, $M_{33}$) is at least nine in number, and it consists additionally in forming, in the first group of lines, a third geometrical line $D_3$, and in the second group of lines, a sixth geometrical line $D_6$, and in determining by approximation, in each of the video images, a first image meeting point ($P_{1i1}$, $P_{1i2}$) constituted as being the point at which the first, second, and third image lines $D_{1i}$, $D_{2i}$, $D_{Di}$ meet, and a second image meeting point ($P_{2i1}$, $P_{2i2}$) considered as being the point at which the fourth, fifth, and sixth image lines $D_{4i}$, $D_{5i}$, $D_{6i}$ meet.

The present invention also provides apparatus for implementing the above-defined method, the apparatus being characterized in that it comprises:

a plurality of marks situated on the surface of a portion of pathway respectively at the points of intersection between two groups of at least two geometrical lines that meet at a first point $P_1$ and at a second point $P_2$;

a support suitable for being installed in direct view of said portion of pathway;

at least two video cameras mounted on said support, each camera having an outlet for video signals representative of video images given by the corresponding video camera; and a programmable video signal processor and analysis unit having inlet terminals connected to the outlets of the two video cameras.

The present invention also provides apparatus for implementing the above-defined method, the apparatus being characterized by the fact that it comprises:

a plurality of marks situated on the surface of a portion of pathway respectively at the points of intersection between two groups of at least two geometrical lines that meet at a first point $P_1$ and at a second point $P_2$;

a support suitable for being installed in direct view of said portion of pathway;

at least two video cameras each having a respective outlet for video signals representative of video images given by the corresponding video camera, each camera having a variable focal length lens controllable from a control inlet;

controllable means for mounting each of the two video cameras to pivot relative to said support about at least two non-coincident axes, said means being suitable for being controlled from control inlets; and a programmable video signal processor and analysis unit having inlet terminals connected to the outlets of the two video cameras, and outlet terminals connected to the control inlets of the controllable means for mounting each of the two video cameras to pivot relative to said support about at least two non-coincident axes, and to the control inlets of the variable focal length lens of each video camera.

Other characteristics and advantages of the invention appear from the following description given with reference to the accompanying drawings by way of non-limiting illustration, and in which.

Figure 1:
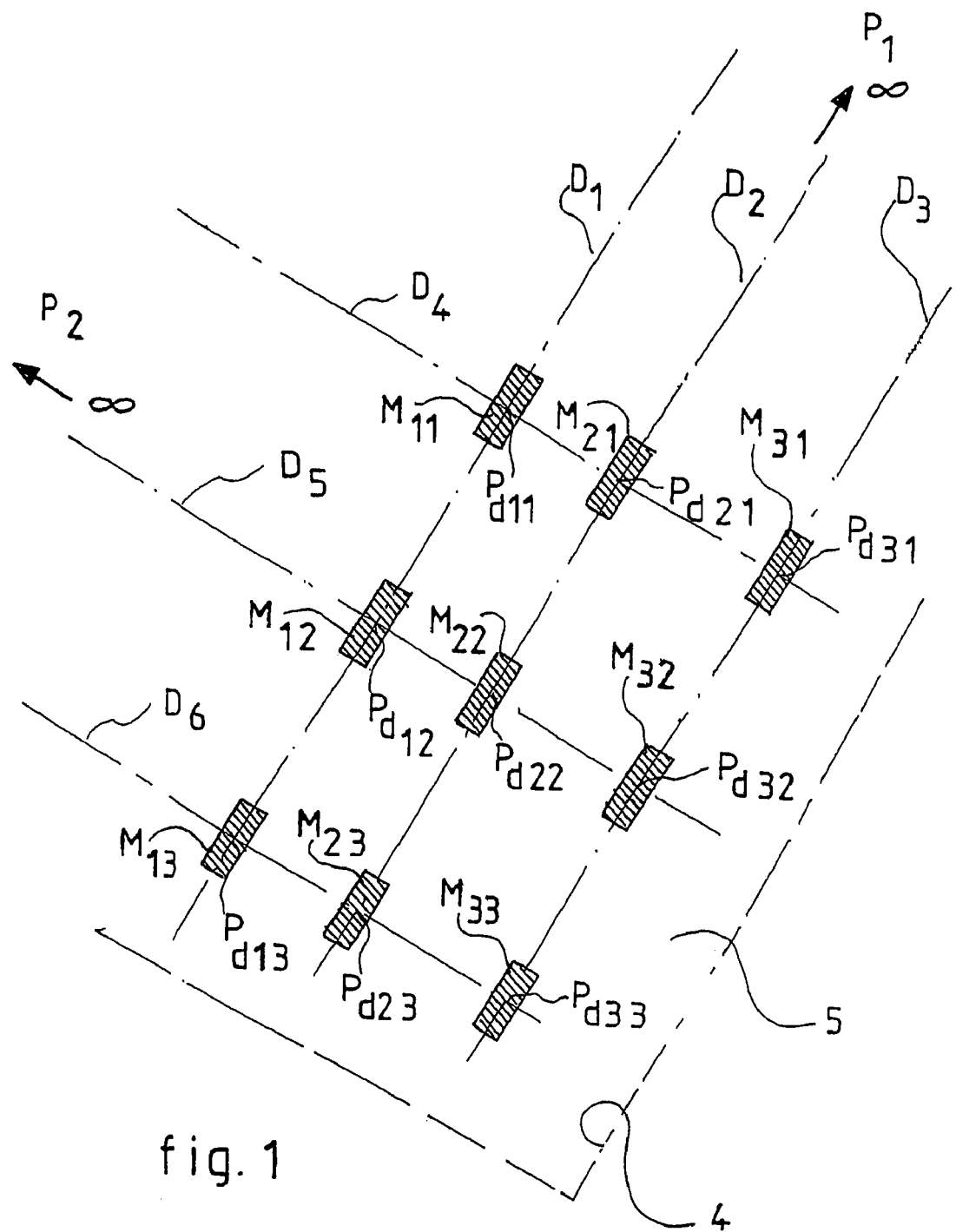
FIG. 1 shows the first stage in implementing the method of the invention for calibrating at least two video cameras relative to each other, this stage consisting in applying some minimum number of marks on the portion of pathway that is to be subjected to surveillance, with FIG. 1 showing the marks after they have been applied to the portion of pathway.

In general, when two cameras 1 and 2 form part of stereoscopic filming apparatus 3 for filming a pathway portion 4 along which bodies of any type might travel, in order to detect the occupation state of said portion of pathway, and in particular in order to detect any incidents that might occur on said portion of pathway, the method of the invention for calibrating the two video cameras relative to each other, consists initially in placing a plurality of marks on the surface 5 of the portion of pathway 4, there being at least four marks, these marks differing in appearance from the surface of the portion of pathway 4 and being distributed in a substantially ordered manner on a first group of first and second geometrical lines $D_1$, $D_2$ meeting at a first point $P_1$, and in such a manner that the given points belonging respectively to the marks having the same ordinate relative to the first point $P_1$ on said first and second geometrical lines $D_1$, $D_2$ are situated on a second group of fourth and fifth geometrical lines $D_4$, $D_5$ meeting at a second point $P_2$ that does not coincide with the first point $P_1$.

The method then consists in using each of the two video cameras to form a video image of said portion of pathway that includes the marks, in defining in each of the two video images, a characteristic point $P_c$ for each mark image, in using the characteristic points $P_c$ to determine a pair of first and second image lines $D_{1i}$, $D_{2i}$, and a pair of fourth and fifth image lines $D_{4i}$, $D_{5i}$, in determining in each video image, a first image meeting point $P_{1i1}$, $P_{1i2}$ between the first and second image lines $D_{1i}$, $D_{2i}$, and a second image meeting point $P_{2i1}$, $P_{2i2}$ between the fourth and fifth images lines $D_{4i}$, $D_{5i}$, and in processing the video signals delivered by each video camera in such a manner that the signals are representative of two images suitable for forming a stereoscopic video image.

Nevertheless, it is specified that this method can also apply to apparatus having more than two cameras should that be necessary. The person skilled in the art will have no difficulty in adapting the method described below to a number of cameras greater than two.

The method described above already gives good results, but in order to obtain results that are even more accurate, the method consists firstly, with reference to FIG. 1, in placing on the surface 5 of the portion of pathway 4, which portion is advantageously selected to be plane or relatively plane, a plurality of marks $M_{11}, M_{12}, M_{13}; M_{21}, M_{22}, M_{23}; M_{31}, M_{32}, M_{33}$ comprising at least nine marks. In general, it is more advantageous for the number of marks to be a multiple of three and equal to not less than nine, so as to make it possible to determine at least three lines in at least two groups of different directions.

For example, when applied to a portion of roadway or the like, it being understood that the ground is gray or even black, the marks may be constituted, for example, by strips that are white or the like, e.g. being stuck to the ground, exactly in the same manner as the white marks that are placed on roads and highways to define traffic lanes, or warning strips, or the like.

According to an important characteristic of the invention, these marks are nevertheless placed on the portion of pathway 4 so as to be distributed substantially in ordered manner on a first group of first, second, and third geometrical lines $D_1, D_2, D_3$ that meet at a first point $P_1$ and in such a manner that given points $P_{d11}, P_{d21}, P_{d31}; P_{d12}, P_{d32}; P_{d13}, P_{d23}, P_{d33}$ belonging respectively to the marks having the same ordinates relative to the first point $P_1$ on said first, second, and third geometrical lines $D_1, D_2, D_3$ are situated on a second group of fourth, fifth, and sixth geometrical lines $D_4, D_5, D_6$ that meet at a second point $P_2$ that does not coincide with the first point $P_1$.

It should be understood that "marks" is used to mean any signs, patterns, etc. of any kind which, when associated in groups of at least two, serve to define such lines.

The two points $P_1$ and $P_2$ may be situated at a finite distance away or at infinity. This second option is advantageous since it makes it possible, when performing surveillance on roadways, to make use of marks on the ground in the form of white or yellow lines that are standardized as being rectangular in shape and that are already placed on the roadway, given that in any event they have a common length, a common width, and a common spacing. They can also be selected to be on portions of road that are rectilinear. By way of example, FIG. 1 is a diagrammatic view of a portion of pathway 4 having placed on its surface 5 nine marks at the intersections between the two groups of three geometrical lines each.

However, it is clear that the marks could also be placed specially on a pathway of any kind whatsoever so as to have the two points $P_1$ and $P_2$ located at a finite distance away.

In order to understand the present description, each mark is ordered on the lines $D_1, D_2, D_3$, i.e. is given an order number counting from the first point of $P_1$. For example, the first mark $M_{11}$ is given the number "1" on the first line $D_1$, and the second mark $M_{12}$ is given the number "2" on said line $D_1$, and so on, it being specified that the same applies for the marks on the other two lines $D_2$ and $D_3$.

As a result, according to a characteristic of the invention specified above, all of the marks having the same order number on the lines $D_1, D_2$, and $D_3$ are situated respectively on the lines $D_4, D_5$, and $D_6$ that intersect at the second point $P_2$.

The points $P_{d11}, P_{d12}, P_{d13}; P_{d21}, P_{d22}, P_{d23}; P_{d31}, P_{d32}, P_{d33}$ given by the marks as defined above can be selected in various ways. For example, when the marks are substantially rectangular in shape, as is the general case on roadways, these given points may either be the points where the diagonals of the marks intersect, or else one of the corners of the rectangles, etc.

Figure 2:
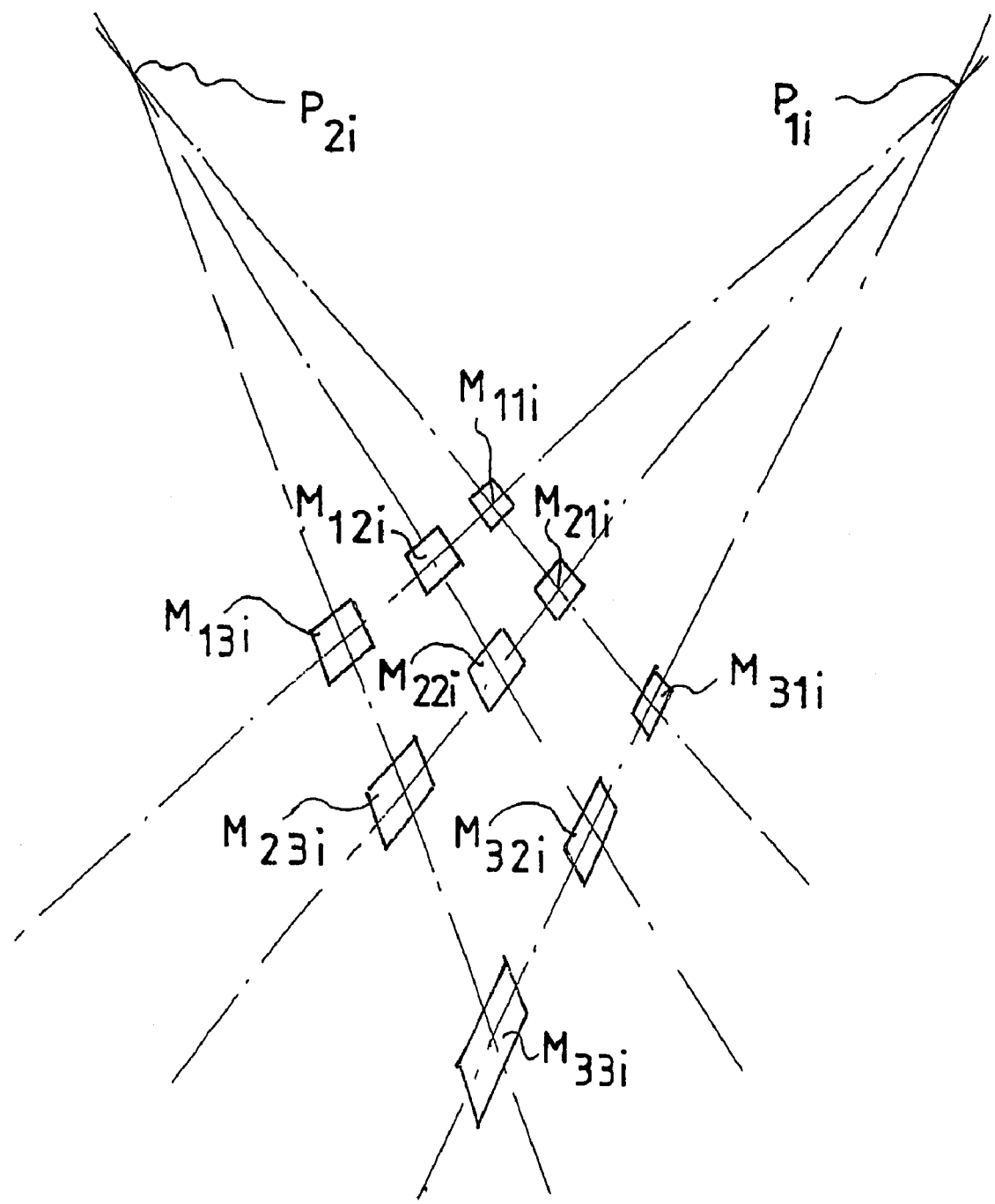
FIG. 2 shows the view that ought then to be obtained with an optical camera, such as a video camera, assuming that the camera is perfect in structure and operation and assuming that the marks are accurately in alignment on the portion of pathway, as explained in the description below.

Thereafter, the method consists, at any time after the above first stage has been accomplished, in using each of the two video cameras to form a respective still or moving image of the portion of pathway 4 containing the marks $M_{11}, M_{12}, M_{13}; M_{21}, M_{22}, M_{23}; M_{31}, M_{32}, M_{33}$. Such an image of the pathway is shown by way of example in FIG. 2.

Figure 6:
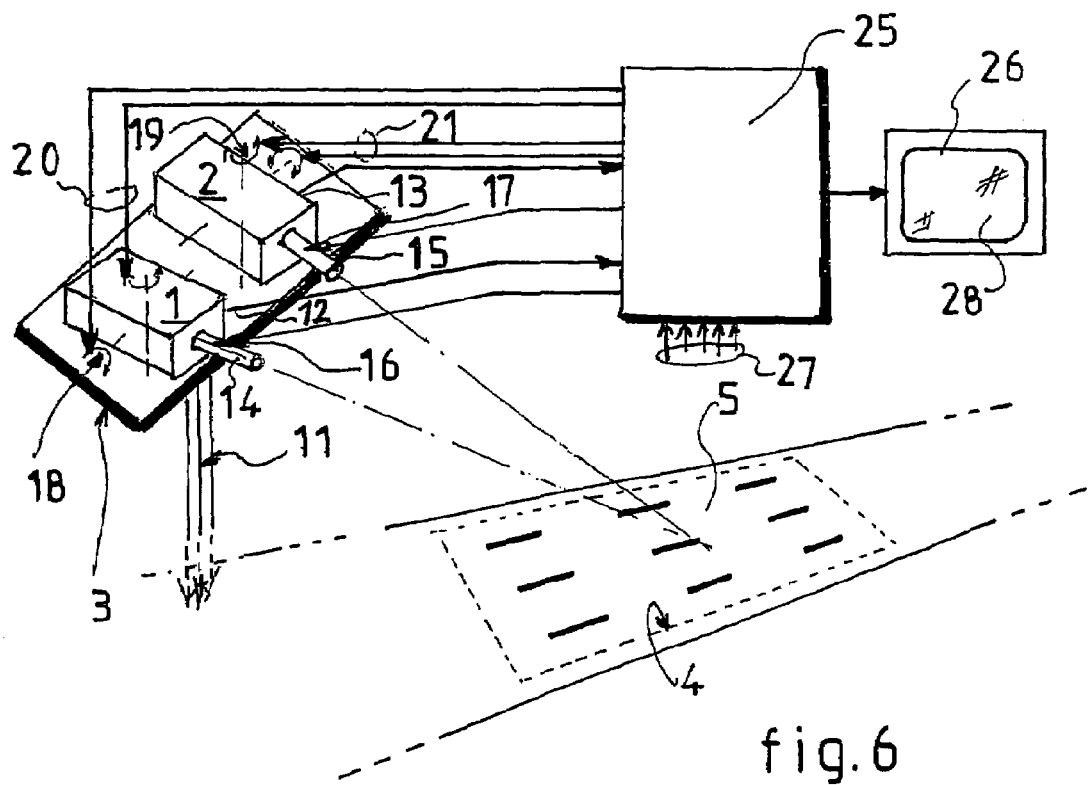
FIG. 6 is a theoretical diagram showing one embodiment of apparatus of the invention enabling the method of the invention to be implemented.

In this view, the images of the geometrical lines $D_1, D_2, D_3$, and $D_4, D_5, D_6$ are shown as intersecting at points situated at finite distances away since it is clear that the cameras are disposed in the manner shown in FIG. 6 in direct view of the portion of pathway 4 so that their optical axes are pointing in a direction that is oblique relative to the surface 5 of the portion of pathway 4. By a perspective effect, the object points $P_1$ and $P_2$ situated at infinity as shown in FIG. 1 now correspond to image points $P_{1i}$ and $P_{2i}$ at distances that are finite. As for the rectangular object marks $M_{11}, M_{12}, M_{13}; M_{21}, M_{22}, M_{23}; M_{31}, M_{32}, M_{33}$ as shown in FIG. 1, they correspond to image marks in the form of arbitrary quadrilaterals $M_{11i}, M_{12i}, M_{13i}; M_{21i}, M_{22i}, M_{23i}; M_{31i}, M_{32i}, M_{33i}$.

The method then consists in defining, in the video image given by each camera, a characteristic point $P_c$ (FIG. 4) or for the set of images of the marks, characteristic points $P_{c11}, P_{c12}, P_{c13}; P_{c21}, P_{c22}, P_{c23}; P_{c31}, P_{c32}, P_{c33}$.

It is possible to determine the characteristic point $P_c$ of each image of the mark in various ways. For example, it is possible to use the intersection of at least two lines interconnecting in respective pairs four non-coinciding points of the image of the mark, for example the diagonals of the quadrilateral constituting the image of the rectangular mark.

Figure 4:
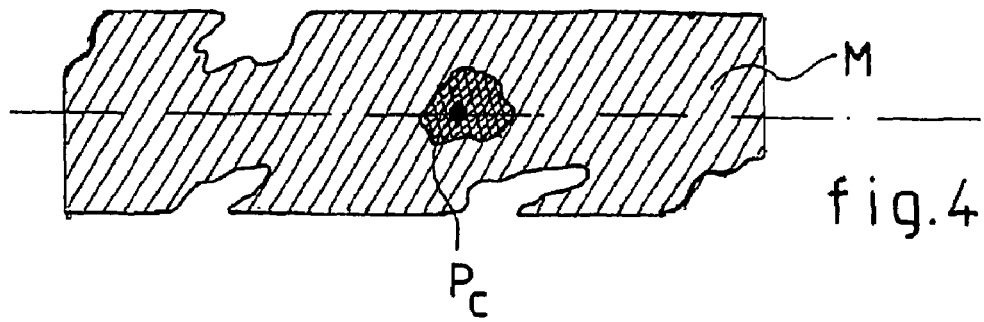
FIG. 4 shows a shape for one of the marks on the portion of pathway, showing a possible state for a mark after it has been subjected to a certain amount of damage over time since being put into place initially in a correct state on said surface of the portion of pathway.

Nevertheless, in an advantageous implementation of the method for performing surveillance of a roadway, since marks on the ground M can suffer damage over time such as the damage shown by way of example in FIG. 4, and thus need not continue to remain accurately rectangular in shape, the characteristic point $P_c$ can be defined, for example, as the center of gravity of the color forming the image of the mark, or by the center of gravity of the total area of the image of the mark, etc.

Once these characteristic points $P_{c11}, P_{c12}, P_{c13}; P_{c21}, P_{c22}, P_{c23}; P_{c31}, P_{c32}, P_{c33}$ have been defined, the method then consists in using these characteristic points $P_c$ to determine a triplet of first, second, and third image lines $D_{1i}, D_{2i}, D_{3i}$ and a triplet of fourth, fifth, and sixth image lines $D_{4i}, D_{5i}, D_{6i}$ corresponding so to speak to images of the respective geometrical lines $D_1, D_2, D_3$ and $D_4, D_5, D_6$.

Figure 3:
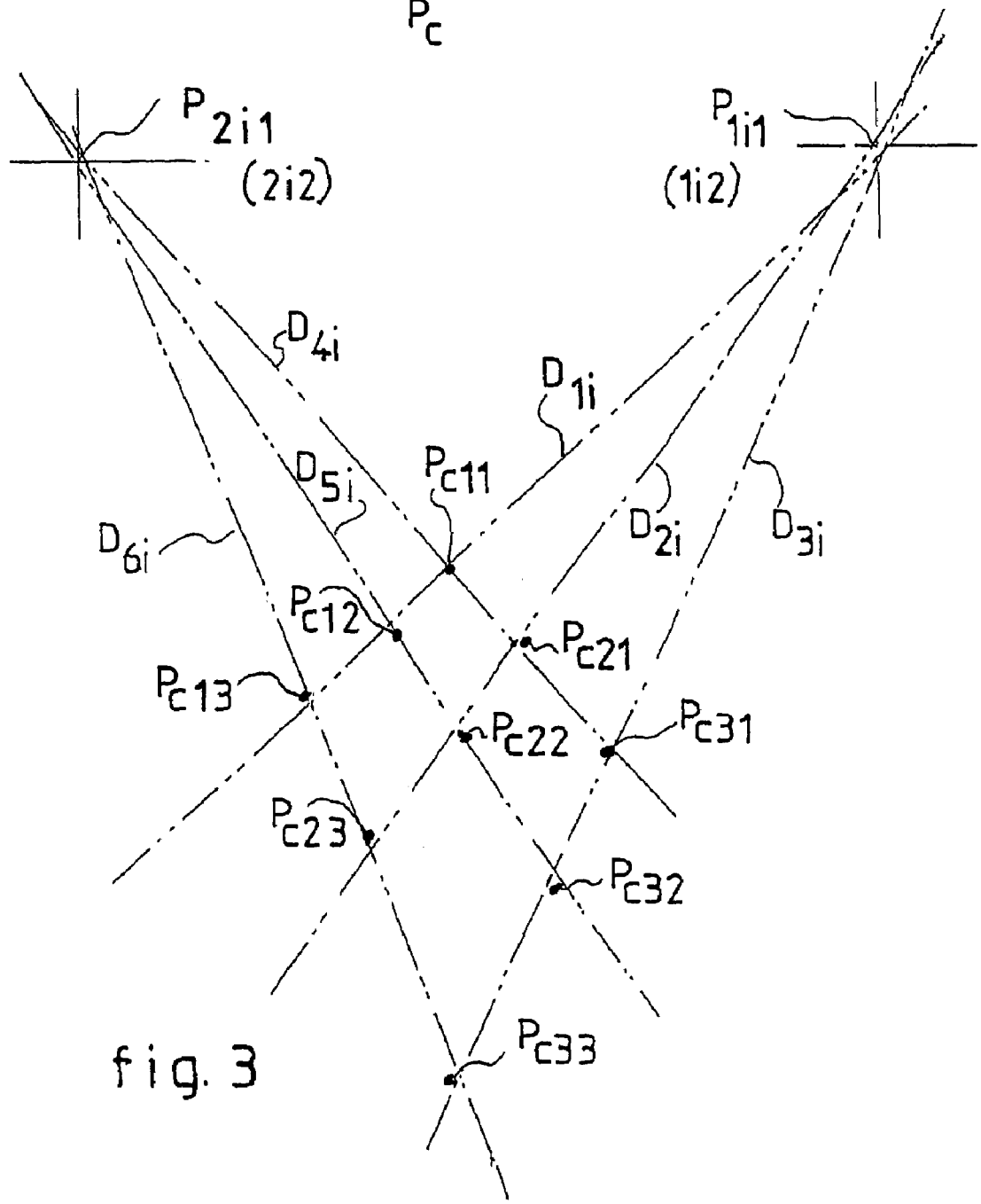
FIG. 3 shows another stage in the method, specifically that which consists in obtaining a "processed" image from a video image obtained by one of the two cameras.

However, as shown in FIG. 3, these image lines $D_{1i}, D_{2i}, D_{3i}$ and $D_{4i}, D_{5i}, D_{6i}$ generally do not meet at respective single points since the characteristic points $P_{c11}, P_{c12}, P_{c13}; P_{c21}, P_{c22}, P_{c23}; P_{c31}, P_{c32}, P_{c33}$ need not be accurately aligned in threes, for example because of uncertainties in image analysis, because of the poor quality of the images of the marks due to the marks being badly damaged, because of atmospheric conditions, etc.

Thus, starting from these two groups of image lines, respectively $D_{1i}, D_{2i}, D_{3i}$ and $D_{4i}, D_{5i}, D_{6i}$, the method consists in determining by approximation in each video image a first image meeting point $P_{1i1}, P_{1i2}$ considered as being the point at which the first, second, third image lines $D_{1i}, D_{2i}, D_{3i}$ are assumed to meet, and a second image meeting point $P_{2i1}, P_{2i2}$ considered as being the point at which the fourth, fifth, and sixth image lines $D_{4i}, D_{5i}, D_{6i}$ meet.

However, in a possible implementation of the method of the invention, the above step consists in repositioning, in the video images, the two groups of three lines each, e.g. $D_{1i}, D_{2i}, D_{3i}$ and $D_{4i}, D_{5i}, D_{6i}$ in such a manner that the lines in each group do indeed intersect at a respective single point, where these meeting points define the image meeting points $P_{1i1}, P_{1i2}$ and $P_{2i1}, P_{2i2}$.

Thus, the two video cameras deliver respective video signals representative of these video images with the first image meeting points $P_{1i1}, P_{1i2}$ and the second image meeting points $P_{2i1}, P_{2i2}$. These video signals are in fact representative of the calibration pattern constituted by the marks $M_{11}$, $M_{12}$, $M_{13}$; $M_{21}$, $M_{22}$, $M_{23}$; $M_{31}$, $M_{32}$, $M_{33}$.

These video signals delivered by each of the cameras can be processed so that, when combined with each other, e.g. on being repositioned, they form two images suitable for forming a single stereoscopic video image, using the technique that is known in this field, as mentioned above.

Figure 5:
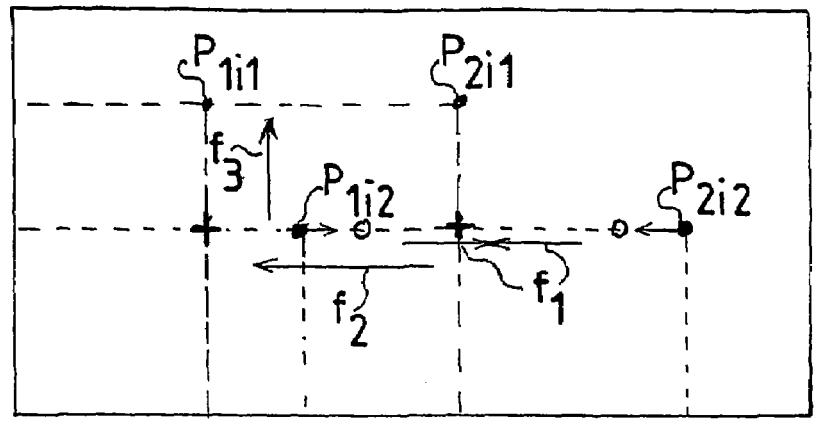
FIG. 5 shows by way of diagrammatic example three stages of the method of the invention in a single view, these stages being amongst the final stages in calibrating at least two video cameras relative to each other.

In a preferred manner, in a first implementation of this last step of the method, the video signals are processed by computer, thereby constituting an implementation that is relatively inexpensive. Such an operation can be performed with a programmable video signal processor unit, e.g. of the microprocessor type, having inlet terminals connected to the outlets 12, 13 of the two video cameras 1, 2, e.g. as shown in FIG. 5.

Preparing such a program for the processor unit comes within the competence of the person skilled in the art, and since it does not form part of the invention, it is not described in detail herein.

Nevertheless, it is possible to implement this last step of the method, not by computer means, but in an electromechanical manner.

This second implementation of the last step of the method is described below since even though it is not the preferred implementation, in that it is relatively expensive given that it requires numerous specific means, it nevertheless makes it possible to explain this last step of the method in even more understandable manner, in particular concerning the above-defined implementation.

In this second implementation of the last step, the method consists in adjusting the two video cameras relative to each other until by repositioning the two video images given by the two video cameras, the first and second image meeting points $P_{1i1}$, $P_{2i1}$ of one video image are at a given distance respectively from the first and second image meeting points $P_{1i2}$, $P_{2i2}$ of the other video image, which distance can easily be determined by a person skilled in the art in order to obtain a stereoscopic effect.

In some cases, this distance may even be of zero value. For example, when applied to surveillance of a portion of roadway, the items to be filmed stereoscopically are situated between the surface 5 of said portion of pathway 4 and the lenses of the cameras, and as a result shifting the images taken by the two video cameras suffices on its own to obtain the stereoscopic effect.

By way of example, the cameras can be adjusted relative to each other by modifying one of the following parameters for each video camera: its elevation, its azimuth, and/or its tilt, its optical field of view, e.g. advantageously by adjusting the focal length of the lens of the camera, its resolution.

FIG. 5 is a diagram showing an example of how the two cameras can be adjusted as mentioned above. The frame in FIG. 5 may represent the screen 28 of a video monitor 26, as shown diagrammatically in FIG. 6, where there are superposed the two images coming from the two cameras after they have been processed as mentioned above. This frame shows the first pair of points $P_{1i1}$ and $P_{2i1}$ as defined by the image given by the first camera 1, and the second pair of points $P_{1i2}$ and $P_{2i2}$ defined by the image given by the second camera 2. In this example, the points $P_{1i2}$ and $P_{2i2}$ of the second pair (represented by large black dots) firstly do not coincide with the points $P_{1i1}$ and $P_{2i1}$ of the first pair, and secondly they are further apart from each other than the distance between the points of the first pair.

Under such circumstances, the two video cameras can be adjusted, for example, as follows: firstly the optical field of the second camera 2 is reduced so as to move the points $P_{1i2}$ and $P_{2i2}$ towards each other along arrows $f_1$ until the distance between them is substantially equal to the distance between the points $P_{1i1}$ and $P_{2i1}$ (the points $P_{1i2}$ and $P_{2i2}$ in this position being represented by small circles), and then the second camera is pivoted about a vertical axis so that the same points $P_{1i2}$ and $P_{2i2}$ are moved along arrow $f_2$ until they come into register with the points $P_{1i1}$ and $P_{2i1}$ the points $P_{1i2}$ and $P_{2i2}$ in this position being represented by "+" signs), and finally, the same second camera is pivoted about a horizontal axis so that the points $P_{1i2}$ and $P_{2i2}$ are moved along arrow $f_3$ until they are superposed or substantially superposed on the points $P_{1i1}$ and $P_{2i1}$.

It is then certain that the two images given by the two cameras can be used for monitoring the state of occupation of a roadway, for example for motor vehicles, using stereo techniques known in the prior art.

The adjustment or calibration of the cameras is then terminated. In the example described above, only the parameters of the camera 2 are modified. However the same result could be obtained by modifying only the parameters of the camera 1, or by modifying simultaneously parameters of both cameras 1 and 2.

The above-described method is easily implemented with apparatus, one embodiment of which is shown diagrammatically in FIG. 6, the apparatus being controlled by software means that can be prepared by the person skilled in the art aware of the description of the various steps of the method as given above.

In general manner, the apparatus comprises a plurality of marks situated on the surface 5 of a portion of pathway 4 to be monitored, corresponding respectively to the intersections of two groups of at least two geometrical lines each that meet at first and second points $P_1$ and $P_2$, a support 11 suitable for being positioned in direct view of the portion of pathway 4, at least two video cameras 1, 2 mounted on the support, and each having a respective video signal outlet 12, 13 delivering signals representative of video images given by the corresponding video camera, and a programmable video signal processor and analysis unit 25 having inlet terminals connected to the outlets 12, 13 of the two video cameras.

In the embodiment as shown in FIG. 6, the apparatus has nine marks $M_{11}$, $M_{12}$, $M_{13}$; $M_{21}$, $M_{22}$, $M_{23}$; $M_{31}$, $M_{32}$, $M_{33}$ situated on three geometrical lines intersecting at first and second points $P_1$, $P_2$, a support 11 suitable for being installed in direct view of the portion of pathway 4, at least two video cameras 1, 2 each having a respective outlet 12, 13 for video signals representative of video images given by the corresponding video cameras, each camera having a lens of variable focal length 14, 15 controllable via a control inlet 16, 17, controllable means 18, 19, e.g. of the gimbals type for mounting each of the two video cameras so as to be capable of being pivoted relative to the support 11 about at least two non-coinciding axes, each coupled for example to a corresponding drive motor, and these means 18, 19 being suitable for being controlled from control inlets 20, 21, and a programmable video signal processor and analysis unit 25, e.g. of the microprocessor or analogous type, having inlet terminals connected to the outlets 12, 13 of the two video cameras 1, 2 and outlet terminals connected to the control inlets 20, 21 of the controllable means 18, 19 so as to mount each of the two video cameras relative to the support 11 so as to be capable of pivoting about at least two non-coinciding axes, and to the control inlets 16, 17 of the variable focal length lens 14, 15 of each of the video cameras, said programmable video signal processor and analysis unit 25 having a programming inlet 27 so as to enable the above-mentioned processing and analysis software to be loaded.

The invention claimed is:

1. A method of calibrating at least two video cameras (1, 2) relative to each other when said two cameras constitute apparatus for stereoscopically filming (3) a portion of pathway (4) suitable for having any type of body traveling therealong, in order to detect the state of occupation of said portion of pathway, and in particular to detect incidents that might occur on said portion of pathway, the method being characterized in that it consists:

in placing a plurality of marks on the surface (5) of the portion of pathway (4), said marks being distributed substantially:

in ordered manner on a first group of first and second geometrical lines $D_1$, $D_2$ meeting at a first point $P_1$; and in such a manner that given points belonging respectively to the marks having the same order relative to the first point $P_1$ on said first and second geometrical lines $D_1$, $D_2$ are situated on a second group of fourth and fifth geometrical lines $D_4$, $D_5$ meeting at a second point $P_2$ that does not coincide with the first point $P_1$;

in forming a video image of said portion of pathway (4) including said marks, using each of the two video cameras;

in defining a characteristic point $P_c$ for each image of a mark in each of the two video images;

in determining first and second image lines $D_{1i}$, $D_{2i}$ and fourth and fifth image lines $D_{4i}$, $D_{5i}$ from said characteristic points $P_c$;

in determining a first image meeting point for the first and second image lines $D_{1i}$, $D_{2i}$ and a second image meeting point for the fourth and fifth image lines $D_{4i}$, $D_{5i}$ in each of the video images; and in processing the video signals delivered by each video camera in such a manner that these signals are representative of two images suitable for being processed by stereovision.

2. A method according to claim 1, characterized by the fact that said plurality of marks ($M_{11}$, $M_{12}$, $M_{13}$; $M_{21}$, $M_{22}$, $M_{23}$; $M_{31}$, $M_{32}$, $M_{33}$) is at least nine in number, and that it consists additionally in forming, in the first group of lines, a third geometrical line $D_3$, and in the second group of lines, a sixth geometrical line $D_6$, and in determining by approximation, in each of the video images, a first image meeting point ($P_{1i1}$, $P_{1i2}$) constituted as being the point at which the first, second, and third image lines $D_{1i}$, $D_{2i}$, $D_{Di}$ meet, and a second image meeting point ($P_{2i1}$, $P_{2i2}$) considered as being the point at which the fourth, fifth, and sixth image lines $D_{4i}$, $D_{5i}$, $D_{6i}$ meet.

3. A method according to claim 1, characterized by the fact that the processing of the video signals delivered by each of the video cameras so that the signals are representative of two images suitable for forming a stereoscopic video image is performed by computer means.

4. A method according to claim 1, characterized by the fact that the processing of the video signals delivered by each of the video cameras so that the signals are representative of two images suitable for forming a stereoscopic video image consists in adjusting the two video cameras relative to each other until, by substantially superposing the two video images given by said two video cameras, the first and second image meeting points ($P_{1i1}$, $P_{2i1}$) of one video image are at a determined distance from the first and second image meeting points ($P_{1i2}$, $P_{2i2}$) of the other video image, in order to obtain a stereoscopic effect.

5. A method according to claim 2, characterized by the fact that it consists in defining the first, second, and third geometrical lines $D_1$, $D_2$, $D_3$ in such a manner as that the first point $P_1$ is situated at infinity.

6. A method according to claim 2, characterized by the fact that it consists in defining the fourth, fifth, and sixth geometrical lines $D_4$, $D_5$, $D_6$ in such a manner that the second point $P_2$ is situated at infinity.

7. A method according to claim 2, characterized by the fact that it consists in repositioning, in the video images, the two groups of three lines each, firstly $D_{1i}$, $D_{2i}$, $D_{3i}$ and secondly $D_{4i}$, $D_{5i}$, $D_{6i}$, in such a manner that they intersect at a single point, said meeting points determining said image meeting points ($P_{1i1}$, $P_{1i2}$) and ($P_{2i1}$, $P_{2i2}$).

8. A method according to claim 2, characterized by the fact that it consists in defining said marks in such a manner that they are substantially identical to one another.

9. A method according to claim 7, characterized by the fact that it consists in distributing said marks ($M_{11}$, $M_{12}$, $M_{13}$; $M_{21}$, $M_{22}$, $M_{23}$; $M_{31}$, $M_{32}$, $M_{33}$) in such a manner that they are situated on at least one of the first and second groups of geometrical lines $D_1$, $D_2$, $D_3$ and $D_4$, $D_4$, $D_6$ at equal distances from one another.

10. A method according to claim 4, characterized by the fact that it consists in adjusting each video camera (1, 2) by modifying at least one of the following of its parameters: its elevation, its azimuth, its optical field of view, its resolution.

11. A method according to claim 1, characterized by the fact that it consists in determining the characteristic point $P_c$ of each mark image by using at least one of the following parameters: the intersection of at least two lines interconnecting four non-coincident points of the mark image respectively in pairs, the center of gravity of the tone of the mark image, the center of gravity of the total area of the mark image.

12. A method according to claim 1, characterized by the fact that it consists, when said marks are substantially rectangular in shape, in determining the given point ($P_{d11}$, $P_{d12}$, $P_{d13}$; $P_{d21}$, $P_{d22}$, $P_{d23}$; $P_{d31}$, $P_{d32}$, $P_{d33}$) by at least one of the following points: the point of intersection of the two diagonals of the rectangle of each mark, one of the vertices of the rectangle.

13. A device implementing the method according to claim 3, the device being characterized by the fact that it comprises:

a plurality of marks ($M_{11}$, $M_{12}$, $M_{13}$; $M_{21}$, $M_{22}$, $M_{23}$; $M_{31}$, $M_{32}$, $M_{33}$) situated on the surface (5) of a portion of pathway (4) respectively at the points of intersection between two groups of at least two geometrical lines that meet at a first point $P_1$ and at a second point $P_2$;

a support (11) suitable for being installed in direct view of said portion of pathway;

at least two video cameras (1, 2) mounted on said support, each camera having an outlet (12, 13) for video signals representative of video images given by the corresponding video camera; and a programmable video signal processor and analysis unit (25) having inlet terminals connected to the outlets (12, 13) of the two video cameras.

14. Apparatus for implementing the method according to claim 4, the apparatus being characterized by the fact that it comprises:

a plurality of marks ($M_{11}$, $M_{12}$, $M_{13}$; $M_{21}$, $M_{22}$, $M_{23}$; $M_{31}$, $M_{32}$, $M_{33}$) situated on the surface (5) of a portion of pathway (4) respectively at the points of intersection between two groups of at least two geometrical lines that meet at a first point $P_1$ and at a second point $P_2$;

a support (11) suitable for being installed in direct view of said portion of pathway (4);

at least two video cameras (1, 2) each having a respective outlet (12, 13) for video signals representative of video images given by the corresponding video camera, each camera having a variable focal length lens (14, 15) controllable from a control inlet (16, 17);

controllable means (18, 19) for mounting each of the two video cameras to pivot relative to said support (11) about at least two non-coincident axes, said means being suitable for being controlled from control inlets (20, 21); and a programmable video signal processor and analysis unit (25) having inlet terminals connected to the outlets (12, 13) of the two video cameras (1, 2), and outlet terminals connected to the control inlets (20, 21) of the controllable means (18, 19) for mounting each of the two video cameras to pivot relative to said support (11) about at least two non-coincident axes, and to the control inlets (16, 17) of the variable focal length lens (14, 15) of each video camera.

15. A method according to claim 2, characterized by the fact that the processing of the video signals delivered by each of the video cameras so that the signals are representative of two images suitable for forming a stereoscopic video image is performed by computer means.

16. A method according to claim 2, characterized by the fact that the processing of the video signals delivered by each of the video cameras so that the signals are representative of two images suitable for forming a stereoscopic video image consists in adjusting the two video cameras relative to each other until, by substantially superposing the two video images given by said two video cameras, the first and second image meeting points ($P_{1/1}, P_{2/1}$) of one video image are at a determined distance from the first and second image meeting points ($P_{1/2}, P_{2/2}$) of the other video image, in order to obtain a stereoscopic effect.

17. A method according to claim 3, characterized by the fact that it consists in defining the first, second, and third geometrical lines $D_1, D_2, D_3$ in such a manner as that the first point $P_1$ is situated at infinity.

18. A method according to claim 4, characterized by the fact that it consists in defining the first, second, and third geometrical lines $D_1, D_2, D_3$ in such a manner as that the first point $P_1$ is situated at infinity.

19. A method according to claim 3, characterized by the fact that it consists in defining the fourth, fifth, and sixth geometrical lines $D_4, D_5, D_6$ in such a manner that the second point $P_2$ is situated at infinity.

20. A method according to claim 4, characterized by the fact that it consists in defining the fourth, fifth, and sixth geometrical lines $D_4, D_5, D_6$ in such a manner that the second point $P_2$ is situated at infinity.

* * * * *